United States Patent [19]

Lee et al.

[11] Patent Number: 5,996,045
[45] Date of Patent: Nov. 30, 1999

[54] IDE DISK DRIVE ARRANGEMENT THAT COMBINES THE CAPACITY OF A MASTER DRIVE AND SLAVE DRIVE WHILE HIDING THE PRESENCE OF SLAVE DRIVE TO A HOST COMPUTER

[75] Inventors: Lane Lee, Lafayette; Mark Gurkowski, Longmont, both of Colo.

[73] Assignee: Seagate Technology, Inc., Scotts Valley, Calif.

[21] Appl. No.: 08/889,465

[22] Filed: Jul. 8, 1997

[51] Int. Cl.[6] .................................................. G06F 12/00
[52] U.S. Cl. .............................. 711/112; 711/114
[58] Field of Search .................... 711/114, 112, 711/111; 714/6

[56] References Cited

U.S. PATENT DOCUMENTS

| | | | |
|---|---|---|---|
| 5,590,375 | 12/1996 | Sangveraphunsiri et al. | 711/114 |
| 5,675,761 | 10/1997 | Paul et al. | 711/111 |
| 5,712,970 | 1/1998 | Arnott et al. | 711/113 |
| 5,740,397 | 4/1998 | Levy | 711/114 |
| 5,778,252 | 7/1998 | Sangveraphunsiri et al. | 710/21 |
| 5,809,285 | 9/1998 | Hilland | 710/129 |

OTHER PUBLICATIONS

Rifkin, A. "Win95 not recognizing Slave Drive with Disk Drive Overlay" [Online] news://microsoft.public.win95.setup, Mar. 3, 1997.

Peter, U. "MR BIOS FAQ for Zappa Owners (lengthy) . . . " [Online] news://comp.sys.ibm.pc.hardware.chips, Oct. 13, 1995.

*Primary Examiner*—Eddie P. Chan
*Assistant Examiner*—Yamir Encarnación
*Attorney, Agent, or Firm*—Flehr Hohbach Test Albritton & Herbert LLP

[57] ABSTRACT

The present invention comprises two IDE disk drives for connection to an IDE bus, configured as a master drive and a slave drive. In the present invention, both drives are capable of receiving commands from a host computer connected to the IDE bus. Depending on the type of conunand which is received, the drive which receives the command determines the appropriate response to the command and initiates a sequence which, in cooperation with the other drive, ensures that the command is executed properly. Thus, the host sends commands over the IDE bus thinking that only one drive is present, and the drives handle between themselves how to respond to the command in a way that mimics the response of a single drive.

32 Claims, 3 Drawing Sheets

IDE DISK DRIVE ARRANGEMENT THAT COMBINES THE CAPACITY OF A MASTER DRIVE AND SLAVE DRIVE WHILE HIDING THE PRESENCE OF SLAVE DRIVE TO A HOST COMPUTER

FIELD OF THE INVENTION

The present invention relates generally to disk drive systems, and more particularly to a disk drive system that incorporates at least two disk drives.

BACKGROUND OF THE INVENTION

Computer users are placing an growing demand on their computers' storage capabilities. As operating systems and programs increase in complexity, power and size, as users store greater amounts of information, and as that information becomes more complex, space on the computer's hard disk drive is quickly used up. In order to gain more storage capacity, many users desire to add a second hard disk drive to their system.

One of the most popular ways to connect a hard disk to a personal computer system is on the IDE bus. When two disk drives are attached on the IDE bus in a personal computer, they are normally referenced by the host as two separately addressable drives. Consequently, the user must keep track of which information is stored in which drives and how much capacity on each drive is available for use. This problem contributes to the difficulty in operating a computer, especially for the less computer literate.

There is therefore a great need for a multiple disk drive system that appears to the host computer, and thus to the user, to be a single disk drive. The user is then freed from worrying about where the information is stored, and the computer system is consequently easier to understand and use.

SUMMARY OF THE INVENTION

The present invention satisfies this need by making two disk drives behave as if they were a single drive. The host system sees a single drive with the total capacity equaling the summation of the capacities of the individual drives.

The present invention comprises two IDE disk drives for connection to an IDE bus, configured as a master drive and a slave drive. In the present invention, both drives are capable of receiving commands from a host computer connected to the IDE bus. Depending on the type of command which is received, the drive which receives the command determines the appropriate response to the command and initiates a sequence which, in cooperation with the other drive, ensures that the command is executed properly. Thus, the host sends commands over the IDE bus thinking that only one drive is present, and the drives handle between themselves how to respond to the command in a way that mimics the response of a single drive.

To accomplish this, several things take place. First, during power-on and after reset, the slave drive is made invisible to the host computer by ignoring attempts by the host computer to set the select bit in the slave drive's status register. Second, a portion of the address space that the host computer uses to address information is mapped to the slave drive. Therefore, while the host computer only sees the master drive, the data is actually divided between the two drives. The master drive is assigned the low addresses and the slave drive is assigned the high addresses. Third, the first N−1 sectors of data on the slave drive are redundantly stored on the end of the master drive. The character N represents the maximum multiple size of the drives. Fourth, the drives communicate to each other to transfer control of the IDE bus, pass commands from one drive to the other, and transfer data between the host computer and the drives. To communicate, the drives utilize the PDIAG* and DASP* signal lines of the IDE bus. Fifth, each drive is able to set and clear the select bit in its status register to take control of the IDE bus in response to the other drive. Last, the commands are divided into classes depending upon the necessary response from the drives. Each drive is aware of the classes and is able to take appropriate action in cooperation with the other drive. Thus, the two drives can coordinate the execution of the commands from the host computer in such a way as to ensure that the commands are executed properly regardless of which drive initially receives the command.

There are six general classes of commands. Each command can be received by either drive, and the exact sequence of actions needed to handle the command will depend upon the drive which received the command. Therefore, there are a total of twelve different sequences. The six classes of commands are:

master only commands, which must be executed by the master drive, both drive commands, which are executed by both drives, with the master drive returning status to the host computer, data access commands which request access to data which physically resides only on the master drive (master-only data), otherwise known as master read/write commands, data access commands which request access to data which physically resides only on the slave drive (slave-only data), otherwise known as slave read/write commands, spanning read commands, which attempt to read a set of data, a portion of which physically resides on the master drive, and a portion of which physically resides on the slave drive, and spanning write commands, which attempt to write a set of data, a portion of which physically resides on the master drive, and a portion of which physically resides on the slave drive.

BRIEF DESCRIPTION OF THE DRAWINGS

These and other features and advantages of the present invention will be more readily understood by referring to the following figures and detailed explanation.

DETAILED DESCRIPTION OF A PREFERRED EMBODIMENT

Figure 1:
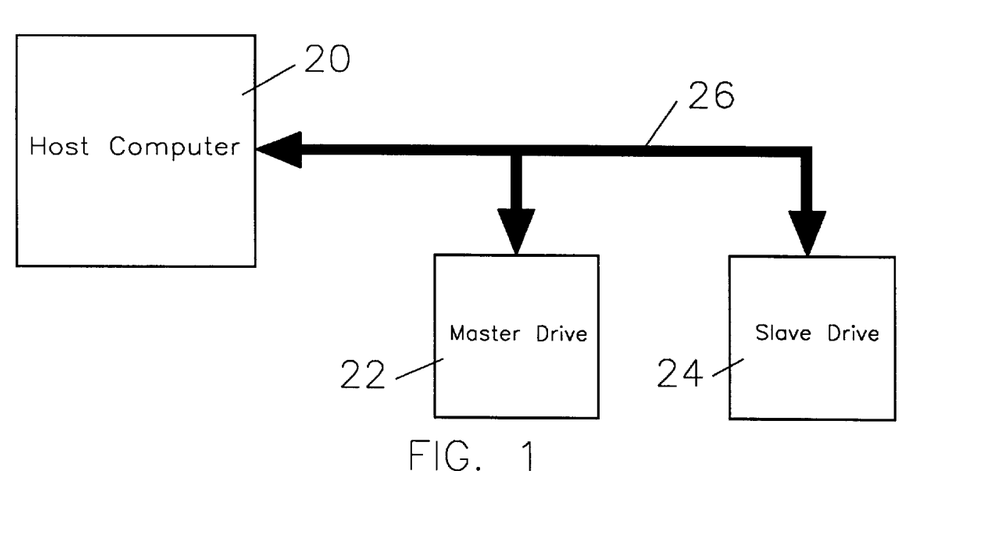
FIG. 1 is a block diagram showing a version of the present invention.

FIG. 1 shows a block diagram of the mass storage system according to the present invention. In FIG. 1, the host computer 20 is connected to two Integrated Device Electronics (IDE) drives 22 and 24 by an IDE bus 26. The IDE bus 26 is thus a means of communication not only between each IDE drive and the host computer 20, but between the two IDE drives 22 and 24. The IDE bus 26 is comprised of a standard collection of signals for communicating data, commands and status. Two of these signals include the Pass Diagnostics signal (PDIAG*) and the Drive Active/Slave Present signal (DASP*). The IDE bus is commonly found in low-cost personal computer systems.

In the present invention, the two IDE drives 22 and 24 appear to the host computer as one IDE drive with a capacity approximately equal to the sum of the capacities of the two IDE drives. For example, if each IDE drive can hold 700 Mega bytes, then the host computer will see a single IDE drive with approximately 1,400 Mega-bytes of storage space. (The exact value will be slightly less than 1,400 Mega-bytes because some segments are redundantly written to both drives and because of drive overhead. Therefore, the exact value will be approximately, or roughly, 1,400 Mega-bytes.) Each of these 1,400 Mega storage locations will be addressed by the host computer using a logical address. Therefore, the logical address of a piece of information is the address of that information in the 1,400 Mega-byte address space seen by the host computer. This logical address must be translated to a physical address on one of the two IDE drives. This mapping is done by dividing the logical address space into two parts and assigning each part to a separate drive. Thus, one drive will store the low address locations and the other drive will store the high address locations.

Figure 2:
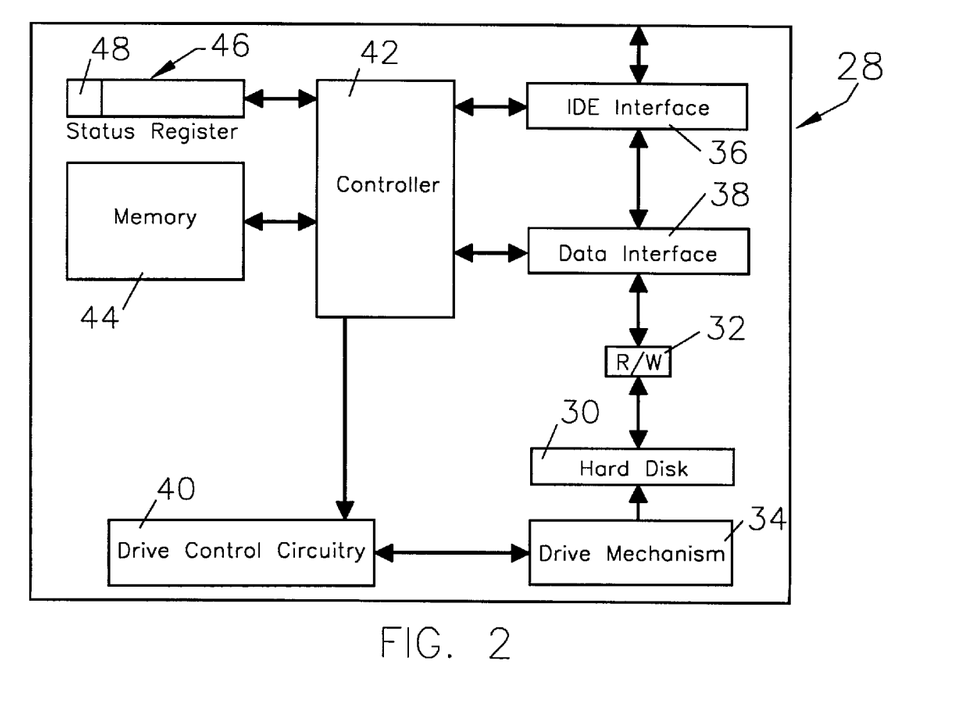
FIG. 2 is a block diagram of one of the two mass storage devices of the present invention.

FIG. 2 shows a block diagram of the internal parts of a typical IDE drive 28, such as IDE drive 22 or 24. The IDE drive 28 comprises a magnetic disk 30 where the data is stored, a read/write head 32 for recording information on the magnetic disk 30 and for reading information from the magnetic disk 30, a drive mechanism 34 for rotating the magnetic disk 30 and positioning the read/write 32 head over the disk surface, an IDE interface 36 for communication with the IDE bus, a data interface 38 for transferring data to/from the read head, and drive control circuitry 40 for controlling the drive mechanism. The IDE drive 28 further comprises a controller 42 for interpreting commands from the IDE bus, for communicating with the other IDE drive and the host computer via the IDE bus, and for controlling the operation of the IDE drive. Where the controller is a microprocessor or microcontroller, the controller is optionally connected to memory 44 for the storage of a control program. The controller also controls the handshaking between the host computer and the IDE drive, or between the two IDE drives.

Each IDE drive also includes a drive/head select register 46 for storing information about the operation of the drive. One bit in this register is called the select bit 48, although this bit may actually be in the drive head register. The select bit 48 is set by the controller 42 or by the host computer when the host computer wants the IDE drive 28 to execute a command. Thus, before the host computer sends a command, the host computer sets the select bit in the IDE drive which is to execute the command. Then, when the command is placed on the IDE bus, the drive which has its select bit set decodes the command and executes it. Also, the select bit determines whether the IDE drive is currently driving the IDE bus. Only one IDE drive can drive the IDE bus at a time, and therefore only one IDE drive has its select bit set at a time.

To make two IDE drives appear to the system as a single IDE drive, several areas need to be addressed. First, each drive must be aware of the portion of the logical address space which has been assigned to it. Furthermore, the host computer must think that only one drive is present. This is accomplished in the following manner.

At power on or during reset, one drive is configured as a master drive and one drive is configured as a slave drive. In the present invention, the master drive stores information with low logical addresses and is the only drive seen by the host computer. The slave drive stores information with high logical addresses, and is invisible to the host computer. Generally, the master drive will receive commands directly from the host computer and hand them off where necessary to the slave drive for execution.

Once a drive has been configured as a master or a slave drive, the drive can then determine what portion of the logical address space maps to physical locations on that drive. Each drive is pre-loaded with information about the size of the other drive so it knows the total size of the logical address space and therefore which portion of that address space is assigned to it.

Also at power on or during reset, each drive executes a self-diagnostic routine to ensure that the IDE drive is functioning properly. If the slave drive is functioning properly, it asserts the PDIAG* signal on the IDE interface to communicate to the master drive that it has passed diagnostics and is ready. The slave asserts DASP* to signal that it is present. After the master/slave protocol is complete, the master is addressed by the host computer as drive 0, and the slave is addressed by the host computer as drive 1.

To ensure that the host computer is only aware of one of the IDE drives, the slave drive is hidden from the host computer. After power on or reset the host computer will attempt to access each drive to determine how many drives are present. As described above, the host computer does this by setting the select bit in the drives' status registers. Thus, the host computer will first set the select bit in the master IDE drive and then send a command to the drives. The master drive responds to the command, and the host computer thus knows that the master is present. The master drive identifies itself to the host computer as a drive with a total capacity approximately equaling the sum of the two drives. This process is determined by the host computer BIOS and may require customization to ensure the host only sees one drive.

Next, the host computer attempts to set the select bit in the slave drive. The slave is programmed to return a status of 00 which is equivalent to "not present". Again, customization for different BIOS may be required. The host thus thinks that the slave drive is not present, because the slave drive did not respond to the command. From this point on, the host is only aware of the master drive, which it thinks is as large as the two drives combined.

The second area addressed by the present invention is during command reception. In the majority of systems, the host computer will preface every command by setting the select bit in the master drive. The host is not required to set the select bit, but almost always does. The ability to receive a command with the slave selected is primarily for robustness.

As will be shown below, the method of drive arbitration utilized in the present invention changes the setting of the select bits in the two IDE drives without the knowledge of the host computer. Occasionally then the select bit in the slave drive will be set at the completion of the requested command. Thus, if the host computer does not set the select bit in the master drive before commands are issued, commands will be issued which will be received by the slave drive. Thus, even though the host computer only knows about the presence of the master drive, commands can nevertheless be received by either drive.

In the present invention, commands are broken down into three classes. The first class consists of data access commands, e.g., read, read w/o retries, write, write w/o retries, read multiple, write multiple, read DMA, write DMA, read verify, & format. When the host computer issues a data access command, the host computer includes the logical address of the data which it wishes to access. Some of the logical addresses presented by the host computer will map to locations on the master drive, and some of the logical addresses will map to locations on the slave drive.

Therefore, a data access command requires that the drive that received the command (either master or slave) look at the requested logical address and determine which drive should handle the request. If the request is for a data location which physically resides on the other drive, then the selected drive transfers control to the other drive through the mechanism described in the section below regarding drive arbitration.

The second class of commands consists of master only commands, e.g., seek, recalibrate, identify, read buffer, write buffer, check power mode and execute diagnostics. These commands are executed only by the master drive. If the commands are received by the slave drive, then the slave transfers control to the master which executes the command.

The third class of commands consists of both drive commands e.g., all other commands including set features, set multiple, and all power commands. These commands are executed by both drives with the selected drive notifying the non-selected drive to do the command. A handshake is performed by the drives so that both drives have completed execution of the command before status is returned to the host. Control is always returned to the master, which returns the final status to the host. This handshake is described in the section on drive arbitration.

The third area addressed by the present invention relates to media accesses at the boundary between the drives. Reads or writes around the boundary area require special attention. In general, data requests will be handled entirely by one drive or the other. In some cases, however, part of the data must be handled by the master, and the second part must be handled by the slave. These requests are referred to as spanning requests.

A read multiple spanning request requires that all the data be available to the host for each block of the transfer. Since the boundary location between the two drives may occur within a block transfer, it is necessary for the master to maintain a copy of the first (N-1) sectors of the slave drive, where N is the maximum multiple size supported by the drive. This redundancy allows the master to transfer a complete block of data, which spans the drives, including some data that is stored at the beginning of the slave drive. During the interblock time, control is transferred to the slave drive to transfer subsequent blocks.

Since the first (N-1) sectors of the drive must be copied onto the end of the master drive, all spanning write commands (sector mode, multiple mode, and DMA mode) are broken into three parts. First, data which is entirely within the master's logical area is transferred to the master. Next, the master notifies the slave to accept data from the host, and the redundant sectors are transferred to both drives. (For write multiple, the number of redundant sectors transferred may be greater than N-1. This is because communication between the drives may only occur between blocks.) Third, the master transfers control to the slave which finishes transferring any remaining sectors from the host. After the slave has transferred all the sectors from the host, it returns the final status to the host.

Drive Arbitration

As described above, control of the IDE bus is determined by the select bit in the two IDE drives. Only one drive can have its select bit set at any time, and the drive which has its select bit set has control of the IDE bus. This control of the IDE bus may need to be transferred for several reasons. Primarily, commands will be sent to the master drive which the slave drive will have to execute, either because the command is to access information which is on the slave drive or because the command is a both drives command, described above. Also, in some systems, the host computer may issue a command which will be received by the slave drive. In that situation, the slave must be able to pass control to the master. Finally, in a spanning command, the master must be able to transfer control to the slave midway through the data transfer.

A feature of the present invention is that this control is transferred by allowing each IDE drive to change the setting of its select bit in response to signals from the other drive.

FIGS. 3–10 illustrate the method of transferring control between the two drives and the handshaking necessary to accomplish the transfer. As shown, the drive controller uses the PDIAG* signal and the DASP* signal on the IDE bus to arbitrate and coordinate the transfer of control between the drives.

When a command is written to the IDE bus, the disk controller in the currently selected drive automatically sets the Busy bit in that drive. The drive that is not selected will do nothing. A protocol for transferring control of the bus is necessary to notify the non-selected drive that a command has been received which the non-selected drive needs to execute. As discussed above, at the end of a command, either the master or slave drive may be selected. If the host does not set the select bit in the master drive before issuing a command, then the next command will be received by the last selected drive. The arbitration protocol transfers control to the proper drive, no matter which drive was selected when the command was issued.

There are two types of commands which the drives may receive: media access commands (read, write, etc.) and non-media access commands. These must be dealt with in slightly different ways.

For media access commands, given that the drive which is selected receives the command (i.e., sets Busy), and the drive which is not selected does not see the command (i.e., does nothing), then the selected drive must decide whether to keep the command or pass it to the other drive. The protocol for these cases are as follows.

Figure 3:
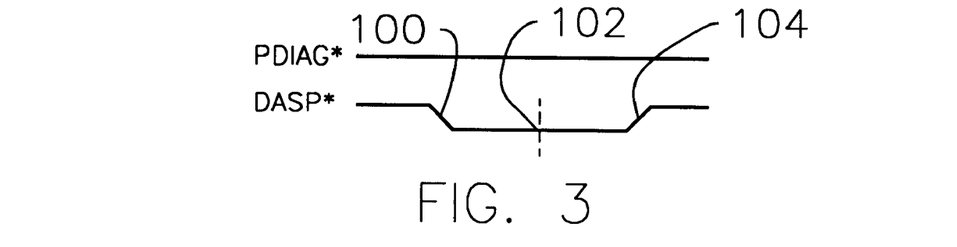
FIGS. 3–10 are timing diagrams showing the timing of signals used in the present invention.

If the logical range is such that the selected drive must handle the command, the selected drive executes the command. The selected drive must handle the command when all of the data referenced by the command physically resides on the selected drive. Referring to FIG. 3, at time 100, the selected drive asserts DASP* to indicate that it has assumed control of the bus. At time 102, the selected drive does the command. At time 104, the selected drive negates DASP* when done with the command.

Figure 4:
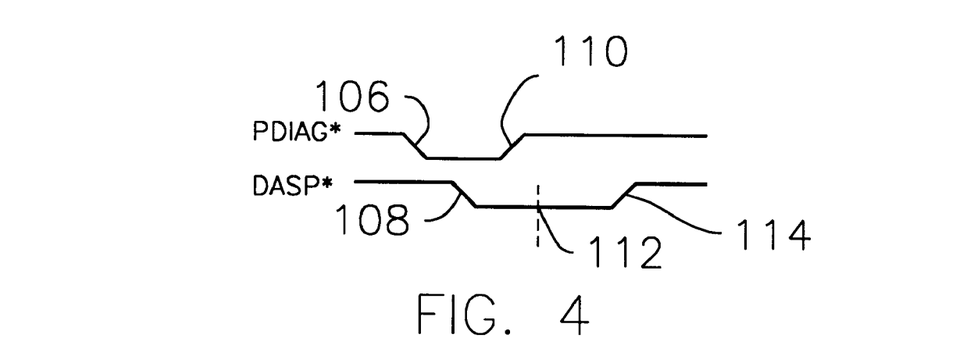

If the logical range is such that the other drive should handle the command, the selected drive notifies the other drive and gives up control of the bus. This is the case where all of the data referenced by the command physically resides on the non-selected drive. Thus, for example, if the command is to write data to addresses which all physically exist on the slave drive, and the master drive receives the command, then the master drive notifies the slave drive and gives up control of the bus to the slave drive. Referring to FIG. 4, at time 106, the selected drive asserts PDIAG* to notify the non-selected drive of the command. At time 108, the non-selected drive assumes control of the bus and asserts DASP*. As explained above, the non-selected drive gains control of the bus by setting its select bit. Thus, the initially non-selected drive is now the newly selected drive.

At time 110, when the initially selected drive sees that DASP* has been asserted, the initially selected drive releases control of the bus by clearing its select bit and negates PDIAG*. The time between time 108 and time 110 must be small to minimize the time when both drives have their select bit selected. Practically, this means that the difference between time 108 and time 110 must be less than about 500 micro-seconds. At time 112, the initially non-selected drive (which is the newly selected drive) performs the command. At time 114, when the newly selected drive is done with the command it negates DASP*.

Spanning read and write commands require access to a set of information. Part of this information is on the master drive and a part is on the slave drive. The master drive will be the first to handle the request because the master drive stores information with lower logical addresses. Therefore, if the slave drive receives the spanning command, it must pass control of the IDE bus to the master.

Figure 5:
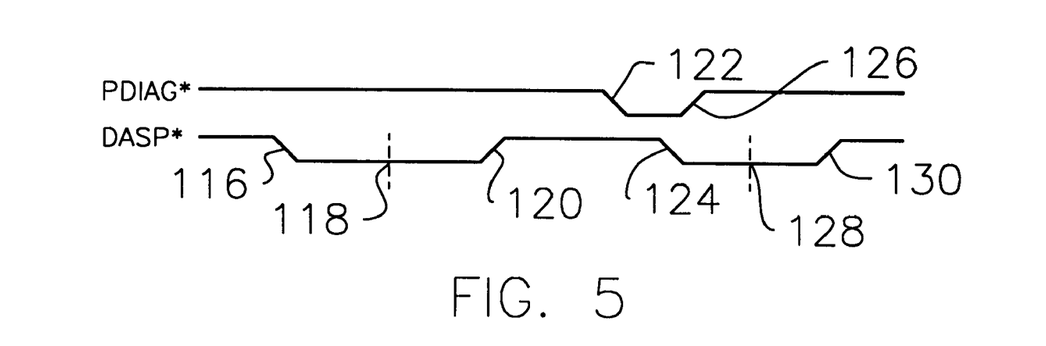

The arbitration sequence for a read spanning command received by the master drive is shown in FIG. 5. Since the master drive received the command, and the first portion of the requested data is on the master drive, the sequence begins by the master transferring the data which it has to the host. To do this, at time 116 the master drive asserts DASP*. Then, at time 118, the master drive transfers its data. At time 120, the master drive has completed the transfer and negates DASP*. Now that the master has completed its portion of the transfer, the master must pass control of the IDE bus to the slave. The master does this by asserting PDIAG* at time 122. The slave, seeing the assertion of PDIAG*, asserts DASP* at time 124 and takes control of the IDE bus by setting its select bit. The master responds to the assertion of DASP* by releasing control of the IDE bus and negating PDIAG* at time 126. At time 128, the slave transfers its portion of the data to the host. At time 130, when the slave has completed the transfer, it returns status to the host, and negates DASP*. At the end of this sequence, the slave is selected. unless the host sets the select bit in the master drive (thus clearing the select bit in the slave drive) before it issues another command, the slave drive will receive the next command from the host.

Figure 6:
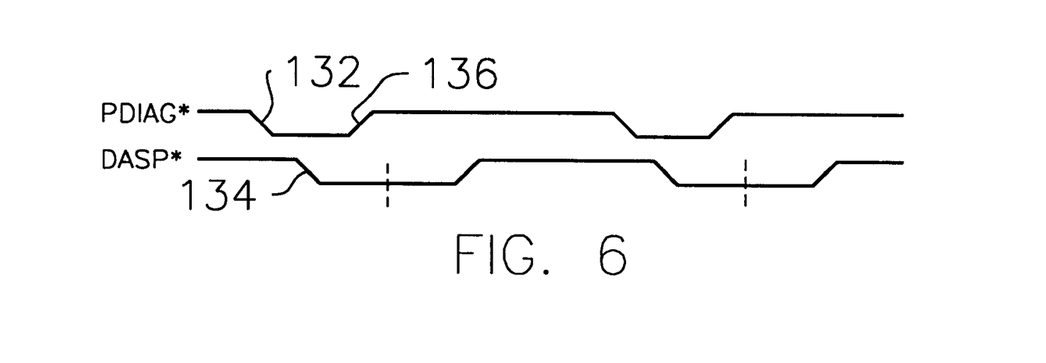

The arbitration sequence for a read spanning command which is received by the slave drive is shown in FIG. 6. The only difference between FIG. 6 and FIG. 5 is that, because the slave drive receives the command, it must transfer control to the master to transfer the first portion of the information. Thus, at time 132, the slave asserts PDIAG* to notify the master drive of the command. At time 134, the master acknowledges the assertion of PDIAG* by asserting DASP* and taking control of the IDE bus. The slave responds to the assertion of DASP* by releasing control of the IDE bus and negating PDIAG* at time 136. Now, the master drive has control of the IDE bus, just as if it had originally received the command. Thus, the rest of the transfer follows the sequence shown in FIG. 5, starting at time 118 in that figure.

For write commands which span the drives, a first section of data is written to the master drive alone. Next, a set of redundant sectors is written on the end of the master drive which contains the first N−1 sectors of the slave drive. Lastly, a final section of data is written to the slave drive alone.

Figure 7:
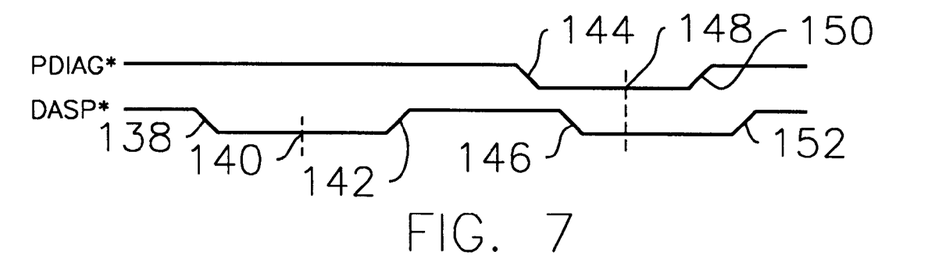

The arbitration sequence for a spanning write command received by the master drive is shown in FIG. 7. At time 138, the master drive asserts DASP*. At time 140, the host computer transfers data which will be written to the master drive alone. When all of this section of data has been written, at time 142 the master drive negates DASP*. To notify the slave to prepare to accept the redundant sectors, the master next asserts PDIAG* at time 144. The slave drive responds by preparing to accept the redundant sectors. At time 146, the slave drive acknowledges that it is ready to accept write data by asserting DASP*. At time 148, the host computer transfers redundant sectors to both drives. Any transfer throttling which must occur is performed by the master. The slave read/write code is forced to be idle during the transfer, therefore, the slave's instantaneous buffer bandwidth is equal to or greater than the master's. At time 150, the master drive notifies the slave drive that it has completed the redundant portion of the write and that it has been written to disk successfully by negating PDIAG*. The slave transfers any remaining sectors from the host and, when completed, negates DASP* at time 152.

Figure 8:
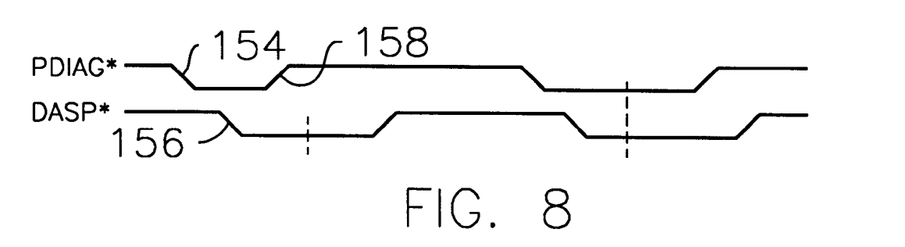

The arbitration sequence for a spanning write command received by the slave drive is shown in FIG. 8. This sequence is roughly identical to the sequence shown in FIG. 7 for the case where the master drive received the command. Here, however, the slave drive received the command, so control of the bus must be transferred to the master drive before the initial section of data can be transferred by the host computer. Therefore, at time 154, the slave drive notifies the master drive of the command by asserting PDIAG*. The master responds by asserting DASP* and taking control of the bus at time 156. Seeing the assertion of DASP* by the master drive, the slave drive responds by negating PDIAG* and releasing the bus at time 158. Now, the master drive has control of the bus and is prepared to accept data from the host computer, just as if the master had originally received the command. Thus, the remainder of the arbitration sequence follows the pattern described above for FIG. 7, beginning with the transfer of data to the master drive alone at time 140.

For non-media access commands, there are two classes of commands: commands which only the master will handle (ID, seek, etc.) and commands which both drives must handle (Init.params, set multiple, power commands).

If the command is a master only command, and the master drive is selected (the master drive receives the command), the master drive simply does the command. The arbitration protocol for this sequence is the same as that described above in relation to FIG. 3.

If the command is a master only command and the slave drive is selected, the slave drive passes control of the bus to the master drive and the master drive executes the command. This is identical to the arbitration protocol described above in relation to FIG. 4 where the selected drive had to pass control to the non-selected drive. Here, the initially selected drive is the slave drive, and the initially non-selected drive is the master drive.

Figure 9:
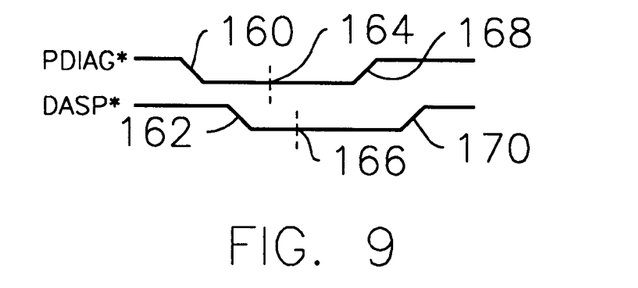
Figure 10:
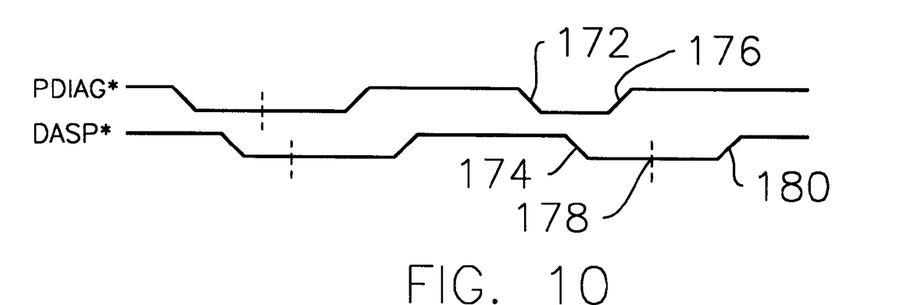

If the command must be handled by both drives, the selected drive notifies the non-selected drive of the command and both perform the command. If the slave receives the command, the arbitration sequence is shown in FIG. 9. At time 160, the slave drive asserts PDIAG* to notify the master drive of the command. At time 162, the master drive assumes ownership of the bus and asserts DASP*. In response to the assertion of DASP*, at time 164 the slave drive releases control of the bus and performs the command. At time 166, the master drive performs the command. At time 168, the slave drive negates PDIAG* after completing the command. At time 170, the newly selected drive negates DASP* after seeing PDIAG* negation and completing the command.

Where a both drives command is received by the master drive, the sequence is shown in FIG. 10. The first part of this sequence is the same as the sequence described in connection with FIG. 9, except the roles of the drives are reversed. Specifically, the master drive notifies the slave drive of the command by asserting PDIAG*, the slave drive asserts DASP*, the master drive negates PDIAG* when it is finished, and the slave drive negates DASP* when it is finished. At this point, both drives have executed the command and the slave drive has control of the bus. For a both drives command, however, the master drive must return status to the host computer. Therefore, the slave drive must transfer control of the bus to the master drive. Thus, at time 172 the slave drive asserts PDIAG* to transfer control to the master drive. At time 174, the master drive assumes ownership of the bus and asserts DASP*. At time 176, the slave drive sees DASP*, releases the bus, and negates PDIAG*. At time 178, the master drive returns status and at time 180 negates DASP*.

The electronics which handle the arbitration and handshaking mentioned above are located in the drive's controller. Typically, the drive controller consists of a processing unit along with an associated memory. In the memory is stored a program which implements the handshaking mechanisms described above. The programing of the controller is well within the ability of the ordinary person skilled in the art.

Thus the present invention requires no hardware changes to the host or the drive. The same cabling is used. Only one IDE port address is required. The present invention uses both the master and slave addresses and connectors. The present invention operates under standard ATA CAM M/S configuration. One disadvantage of the present invention is that a drive which is programmed according to the present invention will not work as a standalone drive. Both drives must be present for the system to operate. Also, one drive programmed according to the current invention cannot be paired with a standard drive. Both drives must be programmed according to the present invention.

Other features and advantages of the present invention may become apparent to a person of skill in the art who studies the present invention disclosures. Therefore, the scope of the present invention is to be limited only by the following claims.

We claim:

1. A mass storage system for a host computer, connected to the host computer by an Integrated Drive Electronics (IDE) bus, said host computer sending a command to said mass storage system via said IDE bus, said mass storage system comprising, a master IDE disk drive comprising:
      receiving means for
         receiving said command from said host computer via an IDE interface, and
      a master controller comprising means for
         selecting the proper execution sequence for said command; and
   a slave IDE disk drive, connected to said master IDE disk drive by said IDE bus, said slave IDE disk drive comprising:
      receiving means for
         receiving said command from said host computer via said IDE interface, and
      a slave controller comprising means
         for selecting the proper execution sequence for said command, and
         for hiding the presence of said slave IDE disk drive from said host computer.

2. An apparatus according to claim 1 wherein said mass storage system is addressed by said host computer using logical addresses and said master controller and said slave controller each further comprise means for mapping said logical addresses onto corresponding physical locations residing on said master IDE disk drive and said slave IDE disk drive.

3. An apparatus according to claim 2 wherein said logical addresses comprise high logical addresses and low logical addresses,
   said low logical addresses map onto said master IDE disk drive and said high logical addresses map onto said slave IDE disk drive, and
   the data on the first N–1 sectors of said slave IDE disk drive is redundantly stored on said master IDE disk drive, where N represents the maximum multiple size of the master IDE disk drive.

4. An apparatus according to claim 3 wherein said command is a both drives command received by said master IDE disk drive and said master controller further comprises means
      for executing said both drives command,
      for transferring control of said IDE bus to said slave IDE disk drive,
      for accepting control of said IDE bus, and
      for returning status to said host computer; and
   said slave controller further comprises means
      for accepting control of said IDE bus,
      for executing said both drives command, and
      for transferring control of said IDE bus to said master IDE disk drive.

5. An apparatus according to claim 3 wherein said command is a slave read/write command received by said master IDE disk drive and said master controller further comprises means
      for transferring control of said IDE bus to said slave IDE disk drive; and
   said slave controller further comprises means
      for accepting control of said IDE bus, and
      for executing said slave read/write command.

6. An apparatus according to claim 3 wherein said command is a spanning read command received by said master IDE disk drive and said master controller further comprises means
      for executing said spanning read command, and
      for transferring control of said IDE bus to said slave IDE disk drive; and
   said slave controller further comprises means
      for accepting control of said IDE bus, and
      for completing said spanning read command.

7. An apparatus according to claim 3 wherein said command is a spanning write command received by said master IDE disk drive and said master controller further comprises means
      for executing said spanning write command,
      for notifying said slave IDE disk drive of said spanning write command,
      for writing redundant data to said master IDE disk drive, and for transferring control of said IDE bus to said slave IDE disk drive; and said slave controller further comprises means
for writing redundant data to said slave IDE disk drive,
for accepting control of said IDE bus, and
for completing said spanning write command.

8. An apparatus according to claim 3 wherein said command is a master only command received by said slave IDE disk drive and said slave controller further comprises means
for transferring control of said IDE bus to said master IDE disk drive; and said master controller further comprises means
for accepting control of said IDE bus, and
for executing said master only command.

9. An apparatus according to claim 3 wherein said command is a both drives command received by said slave IDE disk drive and said slave controller further comprises means
for executing said both drives command, and
for transferring control of the IDE bus to said master IDE disk drive; and said master controller further comprises means
for accepting control of said IDE bus,
for executing said both drives command, and
for returning the status of the drives to the host computer.

10. An apparatus according to claim 3 wherein said command is a master read/write command received by said slave IDE disk drive and said slave controller further comprises means
for transferring control of said IDE bus to said master IDE disk drive; and said master controller further comprises means
for accepting control of said IDE bus, and
for executing said master read/write command.

11. An apparatus according to claim 3 wherein said command is a spanning read command received by said slave IDE disk drive, and said slave controller further comprises means
for transferring control of said IDE bus to said master IDE disk drive, said master controller further comprises means
for accepting control of said IDE bus,
for executing said spanning read command, and
for transferring control of said IDE bus to said slave IDE disk drive; and said slave controller further comprises means
for accepting control of said IDE bus, and
for completing said spanning read command.

12. An apparatus according to claim 3 wherein said command is a spanning write command received by said slave IDE disk drive and said slave controller further comprises means
for transferring control of said IDE bus to said master IDE disk drive, said master controller further comprises means
for accepting control of said IDE bus,
for executing said spanning write command,
for notifying said slave IDE disk drive to prepare to write redundant data,
for writing redundant data to said master IDE disk drive, and
for transferring control of said IDE bus to said slave IDE disk drive; and said slave controller further comprises means
for writing redundant data to said slave IDE disk drive,
for accepting control of said IDE bus, and
for completing said spanning write command.

13. An apparatus according to claim 3 wherein said command is a both drives command received by said master IDE disk drive and said master controller further comprises means
for first asserting PDIAG*,
for next detecting the assertion of DASP* by said slave controller,
for next negating PDIAG*,
for next releasing control of said IDE bus,
for next executing said both drives command,
for next detecting the assertion of PDIAG* by said slave controller,
for next taking control of said IDE bus,
for next asserting DASP*,
for next reporting the status of said master and slave IDE disk drive to said host computer, and
for next negating DASP*; and said slave controller further comprises means responsive to the assertion of PDIAG* by said master controller
for first asserting DASP*,
for next taking control of said IDE bus,
for next executing said both drives command,
for next detecting the negation of PDIAG* by said master controller,
for next negating DASP*,
for next asserting PDIAG*,
for next detecting the assertion of DASP* by said master controller,
for next releasing control of said IDE bus, and
for next negating PDIAG*.

14. An apparatus according to claim 3 wherein said command is a slave read/write command received by said master IDE disk drive and said master controller further comprises means
for first asserting PDIAG*,
for next detecting the assertion of DASP* by said slave controller,
for next releasing control of said IDE bus, and
for next negating PDIAG*; and said slave controller further comprises means responsive to the assertion of PDIAG* by said master controller
for first asserting DASP*,
for next taking control of said IDE bus,
for next executing said slave read/write command, and
for next negating DASP*.

15. An apparatus according to claim 3 wherein said command is a spanning read command received by said master IDE disk drive and said master controller further comprises means
for first asserting DASP*,
for next transferring the data which physically resides on said master IDE disk drive to said IDE bus,
for next negating DASP*,
for next asserting PDIAG*,
for next detecting the assertion of DASP* by said slave controller,
for next releasing control of said IDE bus, and
for next negating PDIAG*; and said slave controller further comprises means responsive the assertion of PDIAG* by said master controller
for first asserting DASP*,
for next taking control of said IDE bus, for next transferring the data which physically resides on said slave IDE disk drive to said IDE bus, and
for next negating DASP*.

16. An apparatus according to claim 3 wherein said command is a spanning write command received by said master IDE disk drive and
said master controller further comprises means
for first asserting DASP*,
for next transferring data destined for said master IDE disk drive from said IDE bus,
for next negating DASP*,
for next asserting PDIAG*,
for next detecting the assertion of DASP* by said slave controller,
for next transferring redundant data from said IDE bus to said master IDE disk drive,
for next negating PDIAG*, and
for next releasing control of said IDE bus; and
said slave controller further comprises means responsive to the assertion of PDIAG* by said master controller
for first asserting DASP*,
for next transferring redundant data from said IDE bus to said master IDE disk drive,
for next detecting the negation of PDIAG* by said master controller,
for next taking control of said IDE bus,
for next transferring data destined for said slave IDE disk drive from said IDE bus, and
for next negating DASP*.

17. An apparatus according to claim 3 wherein said command is a master only command received by said slave IDE disk drive and
said slave controller further comprises means
for first asserting PDIAG*,
for next detecting the assertion of DASP* by said master controller,
for next releasing control of said IDE bus, and
for next negating PDIAG*; and
said master controller further comprises means responsive to the assertion of PDIAG* by said slave controller
for first asserting DASP*,
for next taking control of said IDE bus,
for next executing said master only command, and
for next negating DASP*.

18. An apparatus according to claim 3 wherein said command is a both drives command received by said slave IDE disk drive and
said slave controller further comprises means
for first asserting PDIAG*,
for next detecting the assertion of DASP* by said master controller,
for next releasing control of said IDE bus,
for next executing said both drives command, and
for next negating PDIAG*; and
said master controller further comprises means responsive to the assertion of PDIAG* by said slave controller
for first asserting DASP*,
for next taking control of said IDE bus,
for next executing said both drives command,
for next detecting the negation of PDIAG* by said slave controller,
for next returning the status of said master and said slave IDE disk drives to said IDE bus, and
for next negating DASP*.

19. An apparatus according to claim 3 wherein said command is a master read/write command received by said slave IDE disk drive and
said slave controller further comprises means
for first asserting PDIAG*,
for next detecting the assertion of DASP* by said master controller,
for next releasing control of said IDE bus, and
for next negating PDIAG*; and
and said master controller further comprises means responsive to the assertion of PDIAG* by said slave controller
for first asserting DASP*,
for next taking control of said IDE bus,
for next executing said master read/write command, and
for next negating DASP*.

20. An apparatus according to claim 3 wherein said command is a spanning read command received by said slave IDE disk drive and
said slave controller further comprises means
for first asserting PDIAG*,
for next detecting the assertion of DASP* by said master controller,
for next releasing control of said IDE bus,
for next negating PDIAG*,
for next detecting the assertion of PDIAG* by said master controller,
for next asserting DASP*,
for next taking control of said IDE bus,
for next transferring data which resides on said slave IDE disk drive to said IDE bus, and
for next negating DASP*; and
said master controller further comprises means responsive to the assertion of PDIAG* by said slave controller
for first taking control of said IDE bus,
for next asserting DASP*,
for next transferring data which resides on said master IDE disk drive to said IDE bus,
for next negating DASP*,
for next asserting PDIAG*,
for next detecting the assertion of DASP* by said slave controller,
for next releasing control of said IDE bus, and
for next negating PDIAG*.

21. An apparatus according to claim 3 wherein said command is a spanning write command received by said slave IDE disk drive and said slave controller further comprises means
for first asserting PDIAG*,
for next detecting the assertion of DASP* by said master controller,
for next releasing control of said IDE bus,
for next negating PDIAG*,
for next detecting the assertion of PDIAG* by said master controller,
for next asserting DASP*,
for next transferring redundant data from said IDE bus to said slave IDE disk drive,
for next detecting the negation of PDIAG* by said master controller,
for next taking control of said IDE bus,
for next transferring data destined for said slave IDE disk drive from said IDE bus to said slave IDE disk drive, and
for next negating DASP*; and
said master controller further comprises means responsive to the assertion of PDIAG* by the slave controller
for first taking control of said IDE bus,
for next asserting DASP*, for next transferring data destined for said master IDE disk drive from said IDE bus to said master IDE disk drive, for next negating DASP*, for next asserting PDIAG*, for next detecting the assertion of DASP* by said slave controller, for next transferring redundant data from said IDE bus to said master IDE disk drive, for next negating PDIAG*, and for next releasing control of said IDE bus.

22. A method of handling a command issued by a host computer to a mass storage system, said mass storage system comprising a master Integrated Device Electronics(IDE) disk drive and a slave IDE disk drive, both drives connected to said host computer by an IDE bus, said host computer addressing said mass storage system using a logical address, said method comprising the steps of:

hiding the presence of the slave IDE disk drive from the host computer, selecting the proper execution sequence for said command, mapping said logical addresses onto physical locations on said master IDE disk drive and said slave IDE disk drive, redundantly storing the first N−1 sectors of data on the slave IDE disk drive onto the master IDE disk drive, where N represents the maximum multiple size for the drives.

23. A method according to claim 22 wherein said logical addresses comprise low logical addresses and high logical addresses and said step of mapping further comprises the steps of mapping said low logical addresses onto said master IDE disk drive, and mapping said high logical addresses onto said slave IDE disk drive.

24. A method according to claim 23 wherein said command is a both drives command, said method further comprising the steps of at said master IDE disk drive:
receiving said both drives command from the host computer via the IDE interface,
executing said both drives command, and
transferring control of said IDE bus to said slave IDE disk drive; and at said slave IDE disk drive:
accepting control of said IDE bus,
executing said both drives command, and
transferring control of said IDE bus to said master IDE disk drive; and at said master IDE disk drive:
accepting control of said IDE bus, and
returning status to said host computer.

25. A method according to claim 23 wherein said command is a slave read/write command, said method further comprising the steps of at said master IDE disk drive:
receiving said slave read/write command, and
transferring control of said IDE bus to said slave IDE disk drive; and at said slave IDE disk drive:
accepting control of said IDE bus, and
executing said slave read/write command.

26. A method according to claim 23 wherein said command is a spanning read command, said method further comprising the steps of at said master IDE disk drive:
receiving said spanning read command from the host computer via the IDE interface,
executing said spanning read command, and
transferring control of said IDE bus to said slave IDE disk drive; and at said slave IDE disk drive:
accepting control of said IDE bus, and
completing said spanning read command.

27. A method according to claim 23 wherein said command is a spanning write command, said method further comprising the steps of at said master IDE disk drive:
receiving said spanning write command from the host computer via the IDE interface, and
executing said spanning write command,
notifying said slave IDE disk drive to prepare to write redundant data,
writing redundant data to said master IDE disk drive, and
transferring control of said IDE bus to said slave IDE disk drive; and at said slave IDE disk drive:
writing redundant data to said slave IDE disk drive,
accepting control of said IDE bus, and
completing said spanning write command.

28. A method according to claim 23 wherein said command is a master only command, said method further comprising the steps of at said slave IDE disk drive:
receiving said master only command from the host computer via the IDE interface, and
transferring control of said IDE bus to said master IDE disk drive; and at said master IDE disk drive:
accepting control of said IDE bus, and
executing said master only command.

29. A method according to claim 23 wherein said command is a both drives command, said method further comprising the steps of at said slave IDE disk drive:
receiving said both drives command from the host computer via the IDE interface,
executing said both drives command, and
transferring control of the IDE bus to said master IDE disk drive; and at said master IDE disk drive:
accepting control of said IDE bus,
executing said both drives command, and
returning the status of the drives to the host computer.

30. A method according to claim 23 wherein said command is a master read/write command, said method further comprising the steps of at said slave IIDE disk drive:
receiving said master read/write command from the host computer via the IDE interface, and
transferring control of said IDE bus to said master IDE disk drive; and at said master IDE disk drive:
accepting control of said IDE bus, and
executing said master read/write command.

31. A method according to claim 23 wherein said command is a spanning read command, said method further comprising the steps of at said slave IDE disk drive:
  receiving said spanning read command from the host computer via the IDE interface, and
  transferring control of said IDE bus to said master IDE disk drive, at said master IDE disk drive:
  accepting control of said IDE bus,
  executing said spanning read command, and
  transferring control of said IDE bus to said slave IDE disk drive; and at said slave IDE disk drive:
  accepting control of said IDE bus, and
  completing said spanning read command.

32. A method according to claim 23 wherein said command is a spanning write command, said method further comprising the steps of at said slave IDE disk drive:
  receiving said spanning write command from the host computer via the IDE interface, and
  transferring control of said IDE bus to said master IDE disk drive, at said master IDE disk drive:
  accepting control of said IDE bus,
  executing said spanning write command,
  notifying said slave IDE disk drive to prepare to write redundant data,
  writing redundant data to said master IDE disk drive, and
  transferring control of said IDE bus to said slave IDE disk drive; and at said slave IDE disk drive:
  writing redundant data to said slave IDE disk drive,
  accepting control of said IDE bus, and
  completing said spanning write command.

\* \* \* \* \*